United States Patent
Jakobsen et al.

(10) Patent No.: US 6,661,502 B1
(45) Date of Patent: Dec. 9, 2003

(54) METHOD AND APPARATUS FOR MEASURING THE DIAMETER AND/OR ECCENTRICITY OF A COATING LAYER OF A COATED OPTICAL FIBER

(75) Inventors: Christian Jakobsen, Copenhagen (DK); Flemming Pedersen, Farum (DK)

(73) Assignee: Fitel USA Corp., Norcross, GA (US)

(*) Notice: Subject to any disclaimer, the term of this patent is extended or adjusted under 35 U.S.C. 154(b) by 0 days.

(21) Appl. No.: 09/428,796

(22) Filed: Oct. 28, 1999

(51) Int. Cl.[7] ............................................. G01N 21/00
(52) U.S. Cl. ..................................................... 356/73.1
(58) Field of Search ........................... 356/73.1, 237.1; 250/559.42, 559.43, 559.45, 559.4; 65/486, 377, 488, 381, 491, 382

(56) References Cited

U.S. PATENT DOCUMENTS

| | | |
|---|---|---|
| 4,021,217 A | 5/1977 | Bondybey et al. ............. 65/13 |
| 4,135,902 A | 1/1979 | Oehrle ............................. 65/2 |
| 4,439,467 A | 3/1984 | Kassahun et al. ............ 427/163 |
| 4,924,087 A | 5/1990 | Bailey et al. ................ 356/73.1 |
| 4,988,875 A | 1/1991 | Ortiz et al. ................... 250/330 |
| 5,172,421 A | 12/1992 | Nakamura et al. ............. 382/8 |
| 5,185,636 A | 2/1993 | Button et al. .............. 356/73.1 |
| 5,208,645 A | 5/1993 | Inoue et al. ................ 356/73.1 |
| 5,228,893 A | 7/1993 | Smithgall et al. ................ 65/2 |
| 5,289,265 A * | 2/1994 | Inoue et al. .................. 356/632 |
| 5,772,861 A | 6/1998 | Meredith, Jr. et al. .. 204/298.03 |
| 5,786,891 A | 7/1998 | Jakobsen et al. ............ 356/237 |
| 5,943,126 A | 8/1999 | Aloisio, Jr. et al. ...... 356/237.1 |

OTHER PUBLICATIONS

Cooling and bubble–Free Coating of Optical Fibers at a High Drawing Rate, C.M.G. Jochem et al., vol. LT–4, No. 7, Jul., 1986, Journal of Lightwave Technology, pp. 739–742.

* cited by examiner

Primary Examiner—Tu T. Nguyen
(74) Attorney, Agent, or Firm—Thomas, Kayden, Horstemeyer & Risley, LLP

(57) ABSTRACT

The present invention provides a method and an apparatus for measuring the diameter and/or eccentricity of the one or more coating layers of a coated optical fiber. The present invention preferably is utilized to measure the diameter of the primary coating layer of a coated optical fiber after the primary and secondary coating layers have been applied to the optical fiber. The primary coating layer is disposed about the optical fiber and the secondary coating layer is disposed about the primary coating layer. When a beam of light is projected by a light source through the optical fiber in a direction substantially perpendicular to the axial direction of the optical fiber, an image is formed on an optical detector, which is disposed opposite the light source and substantially perpendicular to the axial direction of the optical fiber. The light passing through the coated optical fiber is focused by a lens onto the optical detector. The lens is coaxially aligned with the beam of light projected by the light source. The image is analyzed by a signal processor to determine the diameter and/or eccentricity of the primary coating layer of the coated optical fiber. The image generated by the optical detector includes first and second bright lines at the interfaces of the primary and secondary coating layers. The relative locations of one or both of these bright lines in the image are utilized to determine the diameter and/or eccentricity of the primary coating layer.

19 Claims, 5 Drawing Sheets

METHOD AND APPARATUS FOR MEASURING THE DIAMETER AND/OR ECCENTRICITY OF A COATING LAYER OF A COATED OPTICAL FIBER

TECHNICAL FIELD OF THE INVENTION

The present invention relates to a method and apparatus for measuring the diameter and/or eccentricity of a coating layer of a coated optical fiber and, more particularly, to a method and apparatus that are capable of being utilized to measure the diameter and/or eccentricity of a primary coating layer of a coated optical fiber during an optical fiber cable manufacturing process.

BACKGROUND OF THE INVENTION

The successful implementation of a light wave communication system requires high quality light guide fibers having mechanical properties sufficient to withstand the stresses to which they are subjected. Each fiber must be capable of withstanding over its entire length a maximum stress level to which the fiber will be exposed during installation and service. The importance of fiber strength becomes apparent when one considers that a single fiber failure will result in the loss of several hundreds of circuits.

The failure of light guide fibers in tension is commonly associated with surface flaws which cause stress concentrations and lower the tensile strength below that of pristine unflawed glass. The size of the flaw determines the level of stress concentration and, hence, the failure stress: Even micron-sized surface flaws cause stress concentrations which significantly reduce the tensile strength of the fibers.

Optical fibers are normally made in a continuous process which involves drawing a thin glass strand of fiber from a partially molten glass preform and thereafter applying the coating layers. A furnace is used to partially melt the preform to permit the fiber to be drawn. The heat of the furnace and the rate of draw of the fiber must be in proper balance so that the optical fiber can be drawn continuously under uniform conditions. Long lengths of light guide fibers have considerable potential strength, but the strength is diminished by airlines or holes occurring in the optical fibers. Furthermore, airlines in optical fibers also interfere with the light-propagation properties of the optical fibers.

Soon after an optical fiber is drawn, the optical fiber is coated with a primary layer of coating material and a secondary layer of coating material. The primary layer of coating material surrounds the optical fiber and serves as a soft cushion for the optical fiber to prevent micro-bending losses. The primary coating layer also seals the outer surface of the optical fiber from environmental conditions, such as atmospheric moisture. This secondary coating layer surrounds the primary coating layer. The secondary coating layer is harder than the primary coating layer and serves to shield the fiber from surface abrasion, which could occur as a result of subsequent manufacturing processes and handling during installation. The secondary coating layer also provides protection against corrosive environments and atmospheric moisture. U.S. Pat. Nos. 5,880,825, 5,828,448 and 5,786,891, which are incorporated herein by reference, are directed to detecting, and/or distinguishing between, defects in an optical fiber coating.

The primary and secondary coating layers are often applied by a dual coating applicator during the fiber drawing process. Therefore, the dual coating applicator applies both the secondary and primary coating layers. The coating layers are subsequently cured in an ultraviolet (UV) lamp system as the coated optical fiber is drawn through the UV lamp system. It is desirable to use a dual applicator for applying both of the coating layers because less coating material is lost than if separate coating applicators are used for applying each of the coating layers. When separate applicators are used, the optical fiber having the primary coating layer thereon must be drawn into the secondary coating applicator and uncured primary coating material may fall away from the optical fiber as it is strung between the applicators. Using a dual applicator eliminates or reduces this problem.

Since the primary and secondary coating layers are applied in a dual applicator, it is not possible to physically obtain access the primary coating layer without removing a portion of the secondary coating layer. Currently, the diameters of the optical fiber and of the secondary coating layer are measured with diameter gauges at the ends of the coated fiber. Measuring these diameters, however, does not provide information about the diameter of the primary coating layer.

It would be desirable to provide a technique for measuring the diameter of the primary coating layer after the primary and secondary coating layers have been applied to the optical fiber without having to physically remove a portion of the secondary coating layer. The primary coating layer must meet certain requirements in order to be deemed satisfactory. One of these requirements is that the primary coating layer must have a proper thickness, or diameter. Another requirement relating to the primary coating layer is that it should have an eccentricity that is within desired or prescribed limits. Therefore, a need exists for a technique for measuring the diameter of the primary coating layer to ensure that it is within desirable or prescribed limits in terms of its diameter and/or in terms of its eccentricity. Furthermore, it would be desirable to perform the technique quickly during the optical fiber cable manufacturing process so that information relating to the diameter of the primary coating layer can be utilized by the draw tower to alter, if necessary, the manufacturing conditions in real time to ensure that the amount of cable having an improper primary coating layer diameter, if any, is minimized or eliminated.

U.S. Pat. No. 5,208,645 to Inoue, et al discloses a method and an apparatus for optically measuring the thickness of an inner coating layer of an optical fiber. The technique disclosed in Inoue, et al. utilizes an observation that, when light is projected through an optical fiber having a coating layer thereon, an intensity distribution having two peaks occurs. It was further observed that these peaks have levels that could be correlated to the thickness of a carbon coating layer on the optical fiber. In order to apply the technique, the thickness of the carbon coating layer is measured by another technique, such as measurement of the electrical resistance of the coating layer. A calibration curve is generated that correlates the electrical resistance to the peaks associated with the intensity distribution. By correlating the peaks of the intensity distribution to the calibration curve, the thickness of the coating layer can be ascertained.

One of the disadvantages of this technique is that it provides no way of determining the thickness of an inner coating layer when more than one coating layer surrounds the optical fiber. Therefore, this technique is unsuitable for determining the diameter of the primary coating layer after the secondary coating layer has been applied. Also, the carbon coating does not correspond to the primary or secondary coating layers of a coated optical fiber, because these layers are comprised of a polymer material. Rather, the carbon coating layer is a coating layer that is applied before the primary coating layer has been applied. Furthermore, the technique utilizes light scattering effects caused by light scattered by the carbon coating to generate the intensity distribution. It does not utilize data relating to light transmitted through the coated optical fiber. Therefore, this technique could not be used to obtain information relating to a coating layer disposed underneath another coating layer.

Accordingly, a need exists for a method and an apparatus for measuring the diameter of the primary coating layer of a coated optical fiber and/or for determining the eccentricity of the primary coating layer.

SUMMARY OF THE INVENTION

The present invention provides an optical detection system for determining the diameter of a primary coating layer that has been applied to an optical fiber and/or for determining the eccentricity of the primary coating layer. The system comprises a light source for projecting a beam of light onto the coated optical fiber in a direction substantially perpendicular to the axis of the optical fiber. A lens focuses light passing through the coated optical fiber onto an optical detector. The optical detector is electrically coupled to a signal processor that processes the output of the optical detector and determines the diameter of the primary coating layer and/or the eccentricity of the primary coating layer.

In accordance with the preferred embodiment of the present invention, the method and apparatus of the present invention are incorporated into the optical fiber cable manufacturing process so that if a determination is made that the primary coating layer does not have the proper diameter or eccentricity, the manufacturing process can be adjusted in real time to ensure that the primary coating layer will have the proper diameter or eccentricity on an ongoing basis as the optical fiber cable is being manufactured. However, the method and apparatus of the present invention may also be applied off-line to determine the diameter of the primary coating layer and/or the eccentricity associated with the primary coating layer. For example, utilizing the present invention off-line would enable a purchaser of coated optical fibers to determine whether the diameter of the primary coating layer and/or the eccentricity of the primary coating layer are satisfactory.

In accordance with the preferred embodiment, laser light is projected from a laser onto the coated optical fiber in a direction perpendicular to the axial direction of the fiber, i.e., in a direction perpendicular to the direction of travel of the fiber. A lens positioned perpendicularly to the axial direction of the fiber and parallel to the direction of projection of the laser light receives the laser light that passes through the coated optical fiber and focuses the light onto the optical detector. The optical detector converts the optical signals into electrical signals and outputs the electrical signals to the signal processor, which processes the electrical signals to determine the diameter of the primary coating layer. The signal processor may also process these electrical signals to determine the eccentricity of the primary coating layer.

It has been determined that when light is projected onto an optical fiber having primary and secondary coating layers applied thereto, the image received by the optical detector will contain relatively bright lines corresponding to relatively high intensity at the interfaces between the coating layers. The locations of these lines can be used to determine the diameter of the primary coating layer and/or the eccentricity of the primary coating layer.

Although the eccentricity of the coated optical fiber can be determined using the aforementioned laser, detector and signal processor, an additional setup comprising a second laser, detector and signal processor can be used to ensure that the eccentricity is accurately calculated. A slim possibility exists that, in the case where the primary coating layer is not concentric with the fiber cladding, this eccentricity may be the result of a deformity in a portion of the primary coating layer that is in the direct path from the laser to the detector. This eccentricity may not be ascertainable by the signal processor from the image data. Using the additional setup ensures that this eccentricity will not remain undetected.

In the case where the additional setup is used, the laser and detector of the additional setup will be perpendicular to the first laser and detector and to the coated fiber. The rays of light projected by each of the lasers will be substantially in the same plane, which will be perpendicular to the axial direction of the coated optical fiber. Therefore, if the eccentricity is not detected by one setup, it will be detected by the other setup. The data collected by each of the detectors can be processed by a single signal processor or a separate signal processor may be utilized to process the output of each of the detectors.

These and other features and advantages of the present invention will become apparent from the following description, drawings and claims.

DETAILED DESCRIPTION OF THE INVENTION

Figure 1:
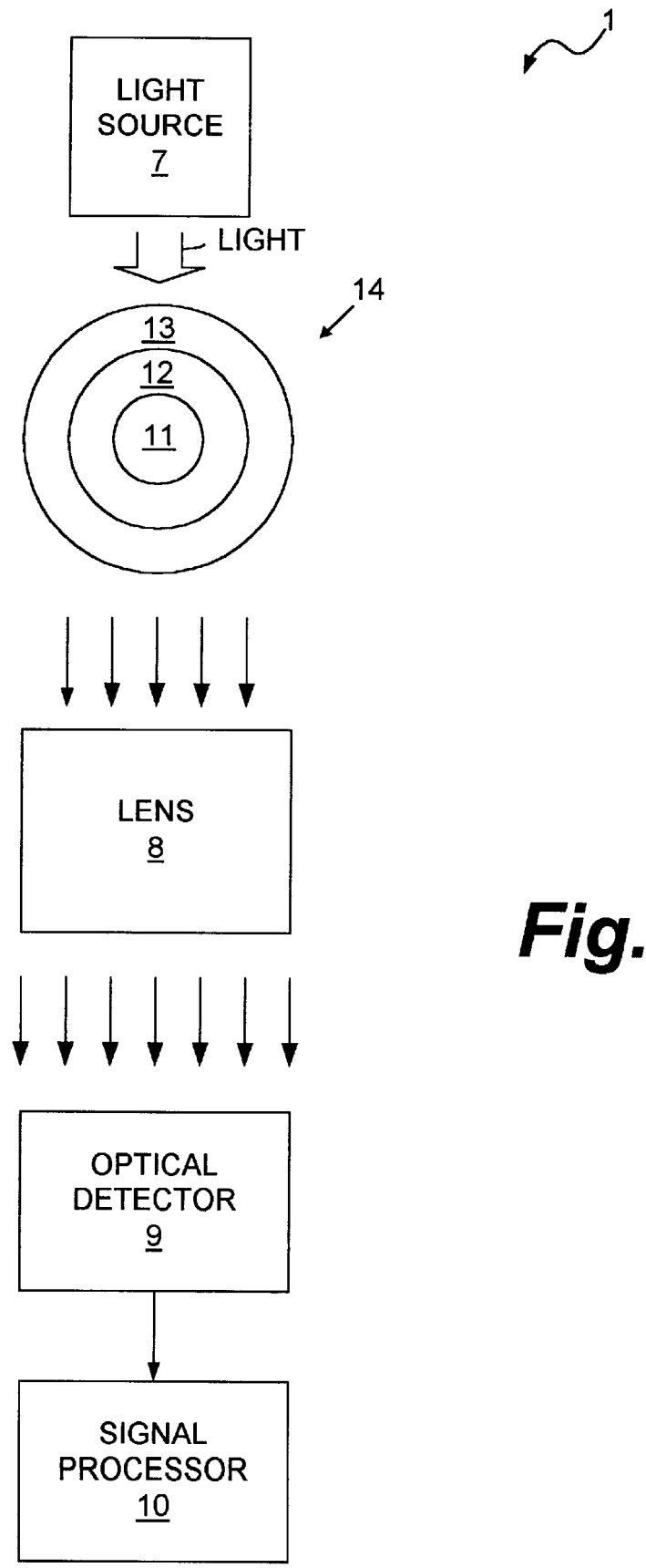
FIG. 1 is a block diagram of the apparatus of the present invention for determining the diameter of a coating layer of an optical fiber in accordance with the preferred embodiment.

FIG. 1 illustrates the preferred embodiment of the apparatus of the present invention for determining the diameter of the primary coating layer of a coated optical fiber. The apparatus 1 of the present invention comprises a light source 7, which preferably is a laser, a lens 8, an optical detector 9, which preferably is a linear photosensor array, and a signal processor 10, which preferably is a microprocessor, as discussed below in more detail.

A coherent beam of substantially monochromatic light is projected by laser 7 onto the coated optical 14. The coated optical fiber 14 comprises a primary coating layer 12, which surrounds the optical fiber 11, and a secondary coating layer 13, which surrounds the primary coating layer 12. The light is projected onto the coated optical fiber 14 in a direction that is substantially perpendicular to the axis of the optical fiber. The lens 8, which preferably is a microscope objective, focuses the light onto the linear photosensor array 9, which is disposed perpendicularly to the axis of the fiber 11. The linear photosensor array 9 converts the optical signals into electrical digital signals, which are then output to signal processor 10. The signal processor 10 then analyzes the digital signals to determine the diameter and/or the eccentricity of the primary coating layer 12.

The signal processor 10 is programmed with software that, when executed by the signal processor 10, performs the method of the present invention. It will be understood by those skilled in the art that a variety of different signal processors are suitable for this purpose. Although a microprocessor preferably is used for this purpose, those skilled in the art will understand that virtually any type of computer is suitable for this purpose, as discussed below in more detail.

Figure 2:
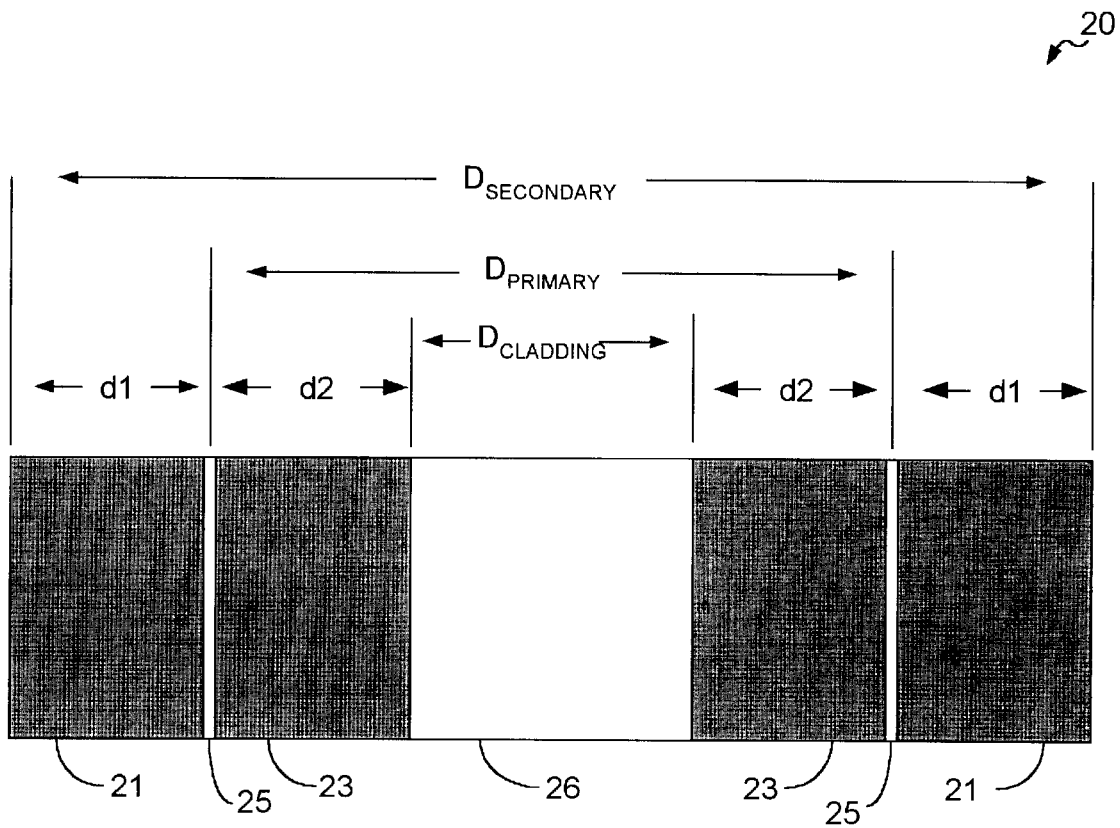
FIG. 2 is illustrates the image of the coated optical fiber generated by the optical detector.

FIG. 2 illustrates the image 20 of the coated optical fiber generated using the output of the linear photosensor array 9. The linear photosensor array 9 comprises a single row of photosensors (not shown), or pixels. Each row of image data generated by the array 9 corresponds to the output of all of the pixels of the array 9. The outer, darker regions 21 of the image 20 correspond to the secondary coating layer of the coated optical fiber. The regions 21 are separated from inner, darker regions 23 of the image 20 by lines 25 of relatively high intensity. These inner, darker regions 23 of the image 20 correspond to the primary coating layer. The innermost bright region 26 corresponds to the fiber cladding.

Figure 3:
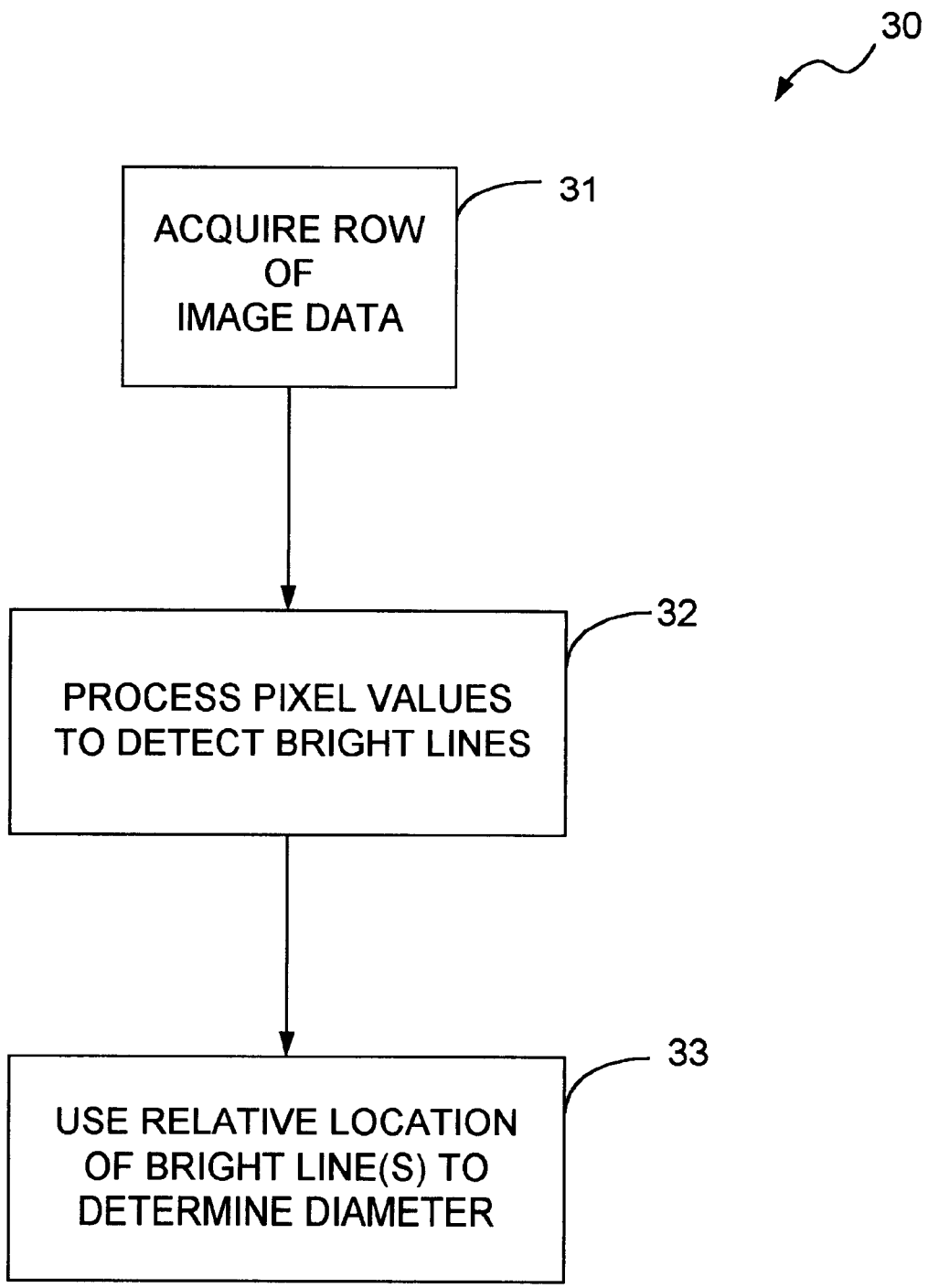
FIG. 3 is a flow chart illustrating the method performed by the signal processor shown in FIG. 1 in order to determine the diameter and/or eccentricity of an optical fiber coating layer.

The coating layers reject most of the light impinging on them. Therefore, the coating layers appear dark in the image. The fiber cladding is transparent to the light. Therefore, the fiber cladding appears bright in the image. Light passes between the boundaries of the primary and secondary coating layers. Therefore, the boundaries appear as bright lines in the image. In accordance with the present invention, a single row of image data output by the photosensor array 9 can be analyzed to determine the diameter and/or the eccentricity of the primary coating layer. With reference to FIG. 3, the first step in the method 30 of the present invention corresponds to the data acquisition step during which a row of image data is acquired by the linear photosensor array 9 and is output to the signal processor 10, as indicated by block 31. The signal processor 10 then processes the pixel intensities to locate the pixels corresponding to the bright lines 25 shown in FIG. 2, as indicated by block 32.

The pixels associated with the bright lines 25 can be located in the image data using a variety of techniques. For example, the signal processor 10 can begin at the outer edges of the image and work inwards towards the central bright region 26, which corresponds to the fiber cladding. Alternatively, the signal processor 10 can begin at the central bright region 26 of the image data and work outwards toward the darker regions 21, 23, which correspond to the coating layers. Another technique, which is the preferred technique, is to first perform a routine that locates the outer edges of the coated optical fiber and then work inwards from the outer edges until the pixels corresponding to the bright lines 25 are encountered. Once the bright lines 25 are encountered, the signal processor 10 uses the information relating to the relative locations of the bright lines to determine the diameter and/or eccentricity of the primary coating layer. Regardless of which technique is used for this purpose, the goal is to locate the pixels corresponding to the interfaces between the coating layers and to use this information to calculate the diameter of the primary coating layer, as indicated by blocks 32 and 33.

Figure 4:
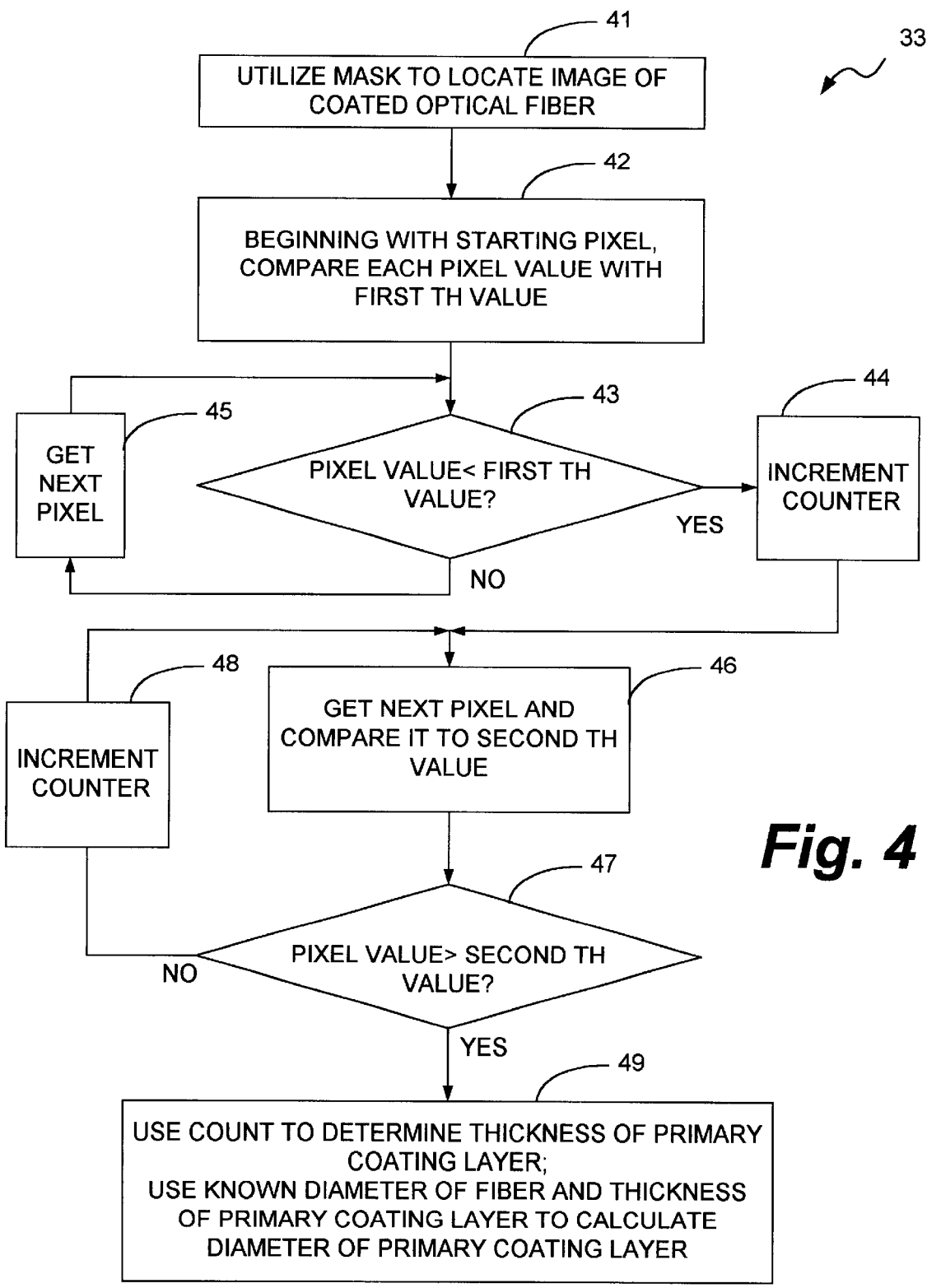
FIG. 4 is a flow chart illustrating the method of the present invention in accordance with the one embodiment performed by the signal processor shown in FIG. 1 in order to determine the diameter of the primary coating layer.
Figure 5:
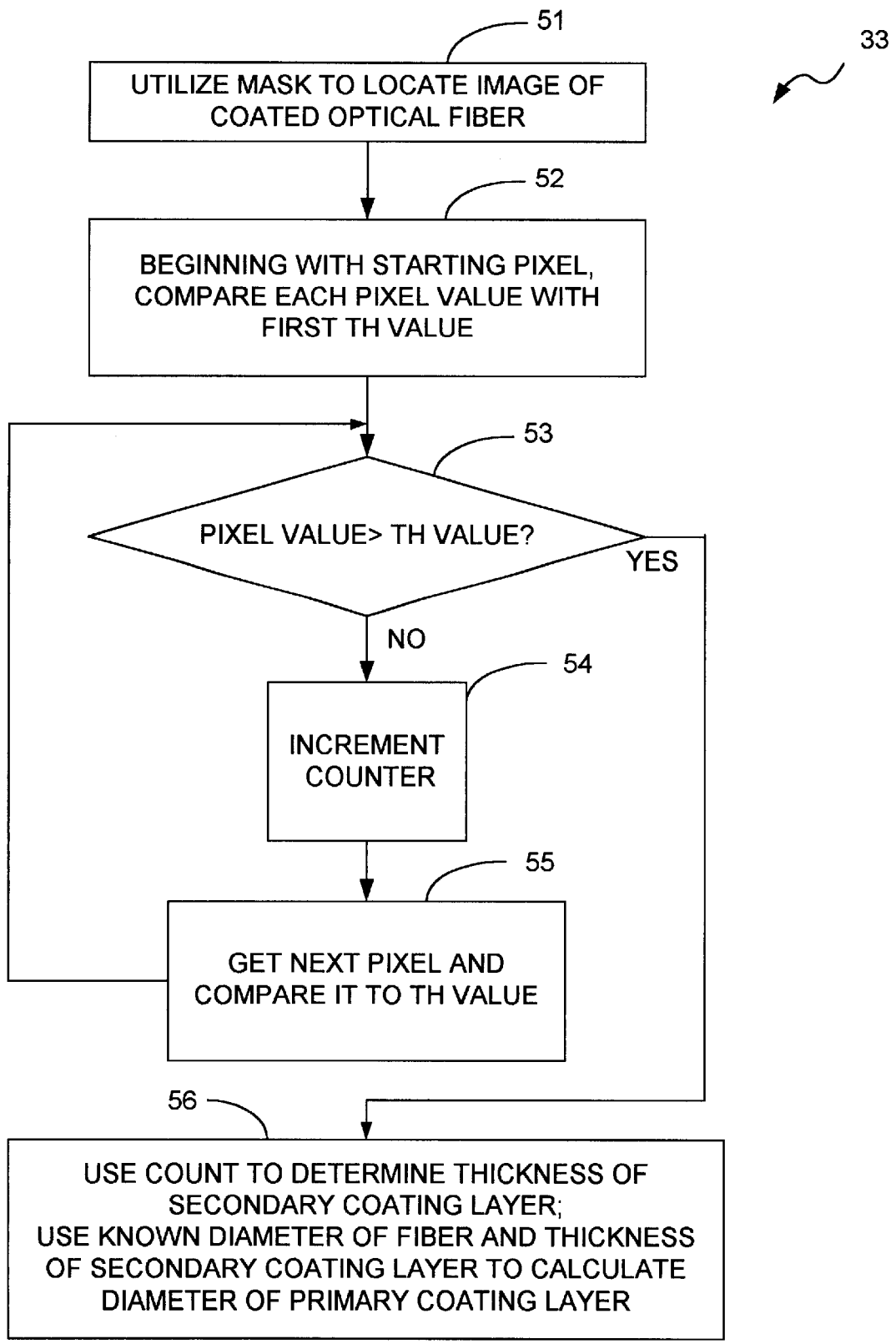
FIG. 5 is a flow chart illustrating the method performing by the signal processor shown in FIG. 1 in accordance with another embodiment to determine the diameter of the primary coating layer.

Once the interfaces between the coating layers have been located, one or both of these locations are utilized to determine the diameter and/or eccentricity of the primary coating layer. This determination can be made in a number of ways. FIGS. 4 and 5, which are discussed below in detail, represent exemplary embodiments for determining the diameter of the primary coating layer using information relating to the relative locations of one or both of the bright lines 25. A correlation exists between pixel locations in the image data and actual locations in the cross-section of the coated optical fiber. This correlation depends on, for example, the magnification of the lens 8, the relative locations of the lens 8, the array 9 and the coated optical fiber 14, etc. Also, the magnification of the lens 8 will determine the length of the linear photosensor array 9. The correlation also depends on the lens effect that the coated optical fiber has on light passing through it.

The signal processor 10 must take this correlation into account in calculating the diameter and/or eccentricity of the primary coating layer. Those skilled in the art will understand the manner in which these factors are taken into account in performing these calculations. The correlation can be determined either by using a calibration routine to determine the proper mapping between pixel locations in the detector array 9 and distance in the coated fiber, or the correlation may be determined computationally by taking into account the aforementioned factors. Those skilled in the art will understand the manner in which either of these tasks can be performed.

FIG. 4 is a flow chart that provides a detailed illustration of the step represented by block 33 in FIG. 3 in accordance with one exemplary embodiment. As each data set is read out of the linear photosensor array 9 by the signal processor 10, the signal processor 10 utilizes a mask (not shown) to locate the edges of the coated optical fiber 14, as indicated by block 41. The mask corresponds to a bright region having a darker region located on each side thereof. The dark regions of the mask correspond to both coating layers. The bright region corresponds to the fiber cladding. The mask may instead comprise only pixel values associated with abrupt changes in the image, i.e., high-intensity pixel values indicating the changes from dark to bright at the boundaries between the primary and secondary coating layers. In this case, the amount of image data that is compared to the mask is reduced and the image of the coated fiber can be located more quickly.

The signal processor 10 utilizes the mask to locate the image of the coated fiber by correlating the mask with the image data received from the linear photosensor array 9. The manner in which a mask can be correlated with image data to locate features in the image data that correspond to the mask is known. Therefore, a detailed discussion of the manner in which the mask is correlated with the image data of the linear photosensor array 9 will not be provided herein in the interest of brevity. Generally, the mask is shifted over the image data acquired by the linear photosensor array 9 and each time the mask is shifted, the mask is correlated with the line of image data to produce a correlation result. The best correlation result corresponds to the image of the coated optical fiber.

Once the signal processor 10 has located the pixels in the image data that correspond to the coated optical fiber 14, the signal processor 10 processes the image data to determine the diameter of the primary coating layer of the coated optical fiber. In accordance with this embodiment, the signal processor 10 begins at a starting pixel in the bright region 26 corresponding to the image of the fiber cladding and then moves outwardly (i.e., toward the secondary layer) with respect to the image, evaluating pixel values until it has detected a pixel value having a much lower intensity value than the intensity values associated with the bright region 26, as indicated by block 42. The signal processor 10 compares each pixel value to a first predetermined threshold value, which is substantially lower than the pixel values within the bright region 26, as indicated by block 43. When a determination is made that a pixel value is lower than the predetermined threshold value, the signal processor 10 determines that it has made a transition from a bright region to a darker region and will determine that it has detected one of the boundaries between the optical fiber itself and the primary coating layer.

Once this boundary has been detected, the signal processor 10 increments a counter, as indicated by block 44, and continues moving in an outwards direction while comparing each pixel value with a second predetermined threshold value, which is substantially larger than the pixel values in the image region associated with the primary coating layer. This step is represented by block 46. The signal processor 10 is now searching for one of the bright lines 25 corresponding to the boundary between the primary and secondary coating layers. As the signal processor 10 compares each pixel value in this region with the second predetermined threshold value, the signal processor 10 will maintain a count of the number of pixels that have been compared, as indicated by block 48.

When the signal processor 10 determines at block 47 that a pixel value is greater than the second predetermined threshold value, the signal processor 10 will determine that this pixel corresponds to one of the bright lines 25 in the image that corresponds to a boundary between the primary coating layer and the secondary coating layer. This count will then be used to determine the distance between the primary coating layer/fiber cladding boundary and the primary coating layer/secondary coating layer boundary. The signal processor 10 will use the aforementioned correlation between pixel locations and actual locations through the cross-section of the coated fiber to convert the count into a distance, which corresponds to the thickness of the primary coating layer. The signal processor 10 will then use this distance to determine the diameter of the primary coating layer, as indicated by block 49. Specifically, the diameter of the primary coating layer can be determined by multiplying this distance by 2 and by adding the resulting product to the diameter of the optical fiber itself (i.e., the fiber cladding), which is known.

This can be seen with reference to FIG. 2. The distance between the primary coating layer/fiber cladding boundary and the bright line 25 is denoted by the distance d2 in FIG. 2. Once this distance is known, it can be multiplied by 2 and the product can be added to the diameter of the fiber cladding, denoted as $D_{CLADDING}$, which is known, to obtain the diameter of the primary coating layer, denoted as $D_{PRIMARY}$.

Another algorithm for determining the diameter of the primary coating layer utilizes the diameter of the secondary coating layer, rather than the diameter of the fiber cladding, to determine the diameter of the primary coating layer. This algorithm will now be discussed with reference to FIG. 5. In accordance with this algorithm, once the signal processor 10 has located the coated optical fiber using the mask, as indicted by block 51, the signal processor 10 begins at one of the outer edges of the image of the coated optical fiber and moves inwardly (i.e., toward the fiber cladding) while comparing each pixel intensity value with a predetermined threshold value to determine whether the pixel corresponds to the interface between the coating layers, as indicated by block 52. The image intensity values of the pixels associated with the coating layers will be relatively small since these regions in the image are relatively dark and darker areas in an image are represented by smaller gray scale values. The image intensity values of the pixels associated with the interfaces between the coating layers (i.e., the bright lines 25) will be relatively large since these regions in the image are relatively bright and brighter areas in an image are represented by larger gray scale values.

For each pixel value, a determination is made as to whether or not the pixel value exceeds the threshold value, as indicated by block 53. This threshold value will be greater than the pixel values associated with the darker image regions of the coating layers. If the pixel value does not exceed the threshold value, the signal processor 10 increments a counter and gets the next pixel value, as indicated by blocks 54 and 55. The signal processor 10 then compares the next pixel value to the threshold value at the step represented by block 53. When a determination is made that the pixel value exceeds the threshold value, then a determination is made that the interface, or boundary 25, between the primary and secondary coating layers has been reached, i.e., that one of the bright lines 25 have been detected.

As the signal processor 10 increments the counter, the signal processor 10 maintains a count of the number of pixels that are compared to the threshold value from the starting pixel up to the point at which a determination is made that the interface between the coating layers has been reached. This count is then utilized by the signal processor 10 to determine the distance from the outer edge of the secondary coating layer to the outer edge of the primary coating layer, which corresponds to the thickness of the secondary coating layer. The diameter of the primary coating layer is then obtained by multiplying the distance between the outer edge of the secondary coating layer and the outer edge of the primary coating layer by 2 and by subtracting the resulting product from the diameter of the secondary coating layer. This step is represented by block 56 in FIG. 5. Referring again to FIG. 2, the distance d1 is the distance from the outer edge of the secondary coating layer to the outer edge of the primary coating layer. By multiplying this distance d1 by 2 and by subtracting that product from the diameter of the secondary coating layer, denoted as $D_{SECONDARY}$ in FIG. 2, which is known, the diameter $D_{PRIMARY}$ of the primary coating layer is obtained.

It should be noted that these algorithms for calculating the diameter of the primary coating layer are only examples of algorithms that can be used for this purpose. Those skilled in the art will understand that other algorithms can be used for this purpose. In the interest of brevity, a detailed discussion of other algorithms that are suitable for performing this task will not be provided herein.

Both of the algorithms discussed above for calculating the diameter of the primary coating layer assume that the primary coating layer is symmetrical about the secondary coating layer, which may not always be the case. Each of the aforementioned algorithms only determines a distance on one side of the image of the coated optical fiber and then multiplies that distance by 2 to obtain a product that is then used to calculate the diameter of the primary coating layer. Therefore, these algorithms assume that the distances through the coating layers are equal everywhere about the circumference of the fiber cladding. Utilizing this assumption enables the signal processor 10 to perform the diameter calculations with great speed and efficiency. However, in some cases, utilizing this assumption can also result in errors, such as in cases where the primary coating layer is not symmetrically disposed about the optical fiber, i.e., where some degree of eccentricity of the primary coating layer exists.

In order to ensure that the calculation of the diameter of the primary coating layer is accurate, the aforementioned calculations may be performed by the signal processor 10 on both sides of the image of the coated optical fiber shown in FIG. 2. For example, in the algorithm discussed above that utilizes the known diameter of the secondary coating layer in calculating the diameter of the primary coating layer, the distance d1 between the outer edges of the secondary coating layer and the outer edges of the primary coating layer would be determined for opposite sides of the image. These distances would then be added (d1+d1) and the resulting sum would be subtracted from the diameter $D_{SECONDARY}$ of the secondary coating layer to obtain the diameter of the primary coating layer $D_{PRIMARY}$.

It should be noted that either of the techniques for calculating the diameter of the primary coating layer discussed above can also be used to determine whether or not the primary coating layer is symmetrical, or, in other words, to determine the eccentricity of the primary coating layer. If the distance d2 from the outer edge of the primary coating layer to the edge of the fiber cladding is not the same on each side of the image shown in FIG. 2, a determination will be made that the primary coating layer is not symmetrical. In invention is shown connected to the junior side of the adapter 62 in order to demonstrate the preferred use of the duplex clip 30 of the present invention. The junior side of the adapter 62 corresponds to the BTW connection of the adapter 62. By connecting the boots 25 of the optical fiber buffer 53 to the duplex clip 30 of the present invention, a duplex connector is produced that is suitable for BTW connections. However, those skilled in the art will understand that the present invention is not limited with respect to the manner in which the duplex clip 30 is used, as will be understood by those skilled in the art. The clip 30 could be used, for example, with connectors coupled to the adapter 62 on the senior side (not shown) of the adapter 62.

The top surface 31 of the duplex clip 30 has markings 71 thereon which serve to identify the polarity of the optical fiber cables maintained in the duplex clip 30. Preferably, the markings 71 are letters, such as the letters A and B, which identify the transmit and receive optical fiber cables, respectively, where A transmits an B receives. The adapter 62 that is utilized with the duplex clip 30 preferably will also have markings 63 and 64 located on it to indicate polarity, as shown in FIG. 6. The A port on the junior side of the adapter 62 couples to the B port on the senior side (not shown) of the adapter 62, and the B port on the junior side of the adapter 62 couples to the A port on the senior side of the adapter 62. Therefore, when a person is connecting the duplex connector to the adapter 62, the person simply ensures that the simplex connectors below the letters A and B on the duplex measurements may be obtained off-line at various locations along the optical fiber cable manufacturing line. For example, the diameter of the optical fiber itself can be measured off-line or at some location along the manufacturing line prior to the optical fiber being coated with the primary and secondary coating layers. The diameter of the secondary coating layer can be measured at some location along the manufacturing line after the primary and secondary coating layers have been applied to the fiber cladding. Therefore, the diameters of the secondary coating layer and of the fiber cladding are readily available for use with the present invention in determining the diameter and/or eccentricity of the primary coating layer.

It should also be noted that the present invention may be utilized to determine the diameters of the secondary coating layer and of the fiber cladding. Therefore, it is not necessary that one or both of these values be made available for use by the method and apparatus of the present invention. Rather, the method and apparatus of the present invention can calculate one or both of these diameters and then use one or both of these diameters to calculate the diameter of the primary coating layer of the present invention. The diameter of the secondary coating layer can be determined by simply counting the number of pixels from one outer edge of the secondary coating layer shown in FIG. 2 to the other outer edge of the secondary coating layer shown in FIG. 2. This count may then be used to determine the distance between those edges, which corresponds to the diameter of the secondary coating layer. The diameter of the fiber cladding can be obtained by counting the number of pixels from one interface of the primary coating layer/fiber cladding shown in FIG. 2 to the other interface of the primary coating layer/fiber cladding shown in FIG. 2. The number of pixels between these interfaces corresponds to the diameter of the fiber cladding.

Once the diameters of the fiber cladding and of the secondary coating layer have been obtained, one or both of these diameters can be used in the manner discussed above to determine the diameter of the primary coating layer. Some or all of this diameter information can be provided by the signal processor 10 to the computer of the fiber draw tower so that it can be utilized by the fiber draw tower to adjust, if necessary, certain parameters of the optical fiber cable manufacturing process in order to ensure that the primary coating layer of optical fiber cable being produced meets requirements.

It is desirable to obtain a large number of measurements as the optical fiber cable is being generated so that determinations can frequently be made as to whether or not the primary coating diameter has dropped below certain tolerances, or whether it will drop below certain tolerances if corrective action is not taken. This allows the manufacturing conditions to be altered quickly in order to correct the problem or to prevent the problem from occurring altogether. The apparatus of the present invention preferably is located at a location along the manufacturing line following the coating applicator. The coated optical fiber is pulled very quickly and it is desirable to obtain a large number of diameter measurements along the coated optical fiber. The linear photosensor array 9 preferably obtains optical measurements of the coated fiber at a very high frame rate, such as, for example, 1,000 frames per second. For typical pulling speeds of the optical fiber along the manufacturing line, this frame rate may correspond to, for example, one measurement for a certain number of centimeters of coated optical fiber. For each of these measurements, a diameter calculation is performed. Therefore, if the diameter of the primary coating layer approaches a value that is outside of the permissible tolerances, the apparatus of the present invention will quickly detect the problem. An appropriate corrective or preventive action can then be taken.

The method of the present invention preferably is performed in software being executed by the signal processor 10, which may any computer that is suitable for performing the aforementioned functions. The term computer, as that term is used herein, is intended to denote any machine capable of performing the calculations, or computations, necessary to perform the tasks of the present invention. In essence, this includes any machine that is capable of accepting a structured input and of processing the input in accordance with prescribed rules to produce an output. Furthermore, it should be noted that although the functions associated with the method of the present invention preferably are performed in software, those skilled in the art will understand that some or all of these functions may also be performed solely in hardware, or in a combination of hardware and software.

The signal processor 10 may also be coupled to a memory device (not shown), which may store programs utilized by the signal processor 10, as well as other data. For example, the data acquired by the signal processor 10 from the linear photosensor array 9 may be saved in memory before the signal processor 10 uses the data to compute the diameter and/or eccentricity information. However, this is not necessary because the image data output by the linear photosensor array 9 preferably is in the form of digital signals that can be immediately utilized by the signal processor 10 to perform the computations. Also, the signal processor 10 only requires a single scan line of image data from the linear photosensor array 9 to perform the computations. Therefore, it is unnecessary to store several scan lines of data in memory for this purpose.

The memory device could also be used to store the results of the diameter and/or eccentricity computations. These results could be immediately or periodically output to the computer of the draw tower so that the results can be used to control various parameters of the optical fiber cable manufacturing process, as previously mentioned. The computer of the draw tower may, in turn, be coupled to a memory device that would be used to archive the diameter and/or eccentricity computations and other information. Such archives could be used to further optimize the method of the present invention, as well as for other purposes.

It should be noted that although the present invention has been described with respect to particular embodiments, the present invention is not limited to these embodiments. It should also be noted that modifications and alterations to the method and apparatus of the present invention can be made which are within the scope of the present invention. It will be apparent to those skilled in the art that components other than those discussed above can be used to construct the apparatus of the present invention. For example, optical detectors and lenses other than those explicitly discussed above will be suitable for use with the present invention. For example, although preferably only a single scan line from the linear photosensor array is used to perform the diameter and/or eccentricity calculations of the present invention, a plurality of scan lines could be used for this purpose. Also, arrays comprising multiple rows of sensor elements could be used to acquire the image data. For example, a video camera could be used for this purpose.

What is claimed is:

1. An apparatus for measuring a diameter of a first coating layer of a coated optical fiber, the optical fiber being coated with the first coating layer and with a second coating layer, the apparatus comprising:

a light source for projecting a beam of light onto the coated optical fiber in a direction substantially perpendicular to a central axis of the coated optical fiber;

a lens disposed opposite the light source and coaxially aligned with the light beam projected by the light source, the coated optical fiber being between the light source and the lens, the lens receiving light projected by the light source that passes through the coated optical fiber;

an optical detector positioned to receive light focused by the lens onto the optical detector, the optical detector comprising an array of photosensors, each photosensor corresponding to a pixel of the optical detector, each pixel having a pixel value associated with an amount of light impinging thereon, wherein the optical detector generates an image of the coated optical fiber in response to the light focused thereon by the lens; and a signal processor electrically coupled to the optical detector, the signal processor receiving the pixel values from the optical detector and processing the pixel values to determine the diameter of the first coating layer, the signal processor determining the diameter of the first coating layer by detecting at least one bright region in the image and determining that said at least one bright region corresponds to a boundary between the first coating layer and the second coating layer, the signal processor utilizing a relative location of said at least one bright region in the image to determine the diameter of the first coating layer.

2. The apparatus of claim 1, wherein the first coating layer corresponds to a primary coating layer of the coated optical fiber and wherein the second coating layer corresponds to a secondary coating layer of the coated optical fiber, the primary coating layer being disposed about the optical fiber and the secondary coating layer being disposed about the primary coating layer.

3. The apparatus of claim 2, wherein the signal processor determines the diameter of the first coating layer by utilizing the relative location of said at least one bright region to determine the thickness of the second coating layer, the signal processor determining the thickness of the second coating layer by counting pixels from the location of the bright region to an edge of the second coating layer opposite the boundary between the first and second coating layers and by correlating the count to a distance, and wherein the signal processor utilizes the thickness of the second coating layer to determine the diameter of the first coating layer by multiplying the thickness by 2 to obtain a first product and by subtracting the first product from a known diameter of the second coating layer.

4. The apparatus of claim 2, wherein the signal processor determines the diameter of the first coating layer by detecting first and second bright regions in the image and by determining that the first bright region corresponds to a first boundary between the first coating layer and the second coating layer and by determining that the second bright region corresponds to a second boundary between the first coating layer and the second coating layer, the signal processor utilizing relative locations of the first and second bright regions in the image to determine the diameter of the first coating layer, wherein the signal processor determines the diameter of the first coating layer by counting pixels from the location of the first bright region to the location of the second bright region to obtain a count that is then correlated to a distance from one outer edge of the first coating layer to another outer edge of the first coating layer, the distance between the outer edges of the first coating layer corresponding to the diameter of the first coating layer.

5. The apparatus of claim 2, wherein the apparatus is comprised as part of an optical fiber manufacturing system that manufactures optical fiber cables, the optical fiber manufacturing system comprising a dual coating applicator for applying the primary and secondary coating layers, the optical detector and the lens being disposed at locations downstream of the dual coating applicator such that the apparatus determines the diameter of the primary coating layer after the primary and secondary coating layers have been applied.

6. The apparatus of claim 1, wherein the first coating layer corresponds to a secondary coating layer of the coated optical fiber and wherein the second coating layer corresponds to a primary coating layer of the coated optical fiber, the primary coating layer being disposed about the optical fiber and the secondary coating layer being disposed about the primary coating layer.

7. The apparatus according to claim 1, wherein the light source is a laser.

8. The apparatus according to claim 1, wherein the optical detector is a linear photosensor array disposed perpendicular to the central axis of the optical fiber, the linear photosensor array comprising a line of sensor elements, the line of sensor elements being perpendicular to the central axis of the optical fiber, the diameter of the first coating layer being determined based on a single scan line of image data read out of the linear photosensor array by the signal processor.

9. The apparatus according to claim 1, wherein the optical detector is a video camera.

10. A method for measuring a diameter of a first coating layer of a coated optical fiber, the optical fiber being coated with the first coating layer and with a second coating layer, the method comprising the steps of:

projecting a beam of light onto the coated optical fiber in a direction substantially perpendicular to a central axis of the coated optical fiber;

receiving light projected onto the coated optical fiber after the light has passed through the coated optical fiber;

focusing the received light onto an optical detector positioned substantially perpendicular to a central axis of the coated optical fiber, the optical detector comprising an array of photosensors, each photosensor corresponding to a pixel of the optical detector, each pixel having a pixel value associated with an amount of light impinging thereon, the optical detector generating an image of the coated optical fiber in response to the light focused thereon;

processing the pixel values to determine the diameter of the first coating layer, the diameter of the first coating layer being determined by detecting at least a first bright region in the image and determining that said at least a first bright region corresponds to a first boundary between the first coating layer and the second coating layer; and utilizing a relative location of said at least one bright region in the image to determine the diameter of the first coating layer.

11. The method of claim 10, wherein the first coating layer corresponds to a primary coating layer of the coated optical fiber and wherein the second coating layer corresponds to a secondary coating layer of the coated optical fiber, the primary coating layer being disposed about the optical fiber and the secondary coating layer being disposed about the primary coating layer.

12. The method of claim 11, wherein the utilizing step comprises the steps of:

utilizing the relative location of said at least a first bright region to determine the thickness of the second coating layer, the thickness of the second coating layer being determined by counting pixels from the location of the bright region to an edge of the second coating layer opposite the boundary between the first and second coating layers and by correlating the count to a distance; and multiplying the thickness by 2 to obtain a first product and subtracting the first product from a known diameter of the second coating layer to obtain the diameter of the primary coating layer.

13. The method of claim 11, wherein the processing step further comprises the step of detecting a second bright region in the image, the second bright region corresponding to a second boundary between the first coating layer and the second coating layer, and wherein the utilizing step comprises the steps of:

counting pixels from the location of the first bright region to the location of the second bright region and correlating the count to a distance from one outer edge of the first coating layer to another outer edge of the first coating layer, the distance between the outer edges of the first coating layer corresponding to the diameter of the first coating layer.

14. The method of claim 11, wherein the method is utilized in an optical fiber cable manufacturing process being performed by an optical fiber manufacturing system that manufactures optical fiber cables, the optical fiber manufacturing system comprising a dual coating applicator for applying the primary and secondary coating layers, the optical detector being disposed downstream of the dual coating applicator such that the image of the coated optical fiber is generated after the primary and secondary coating layers have been applied to the optical fiber by the dual coating applicator, and wherein the diameter of the primary coating layer is determined after the primary and secondary coating layers have been applied.

15. The method of claim 10, wherein the first coating layer corresponds to a secondary coating layer of the coated optical fiber and wherein the second coating layer corresponds to a primary coating layer of the coated optical fiber, the primary coating layer being disposed about the optical fiber and the secondary coating layer being disposed about the primary coating layer.

16. An optical fiber manufacturing system, the optical fiber manufacturing system comprising:

a dual coating applicator for applying a first coating layer and a second coating layer to an optical fiber as the optical fiber passes through the coating applicator in an axial direction of the optical fiber from a first end of the coating applicator toward a second side of the coating applicator;

a light source for projecting a beam of light onto the coated optical fiber in a direction substantially perpendicular to a central axis of the coated optical fiber, the light source being located downstream of the coating applicator with respect to the axial direction of movement of the optical fiber;

a lens disposed opposite the light source and coaxially aligned with the light beam projected by the light source, the coated optical fiber being between the light source and the lens, the lens receiving light projected by the light source that passes through the coated optical fiber;

an optical detector positioned to receive light focused by the lens onto the optical detector, the optical detector comprising an array of photosensors, each photosensor corresponding to a pixel of the optical detector, each pixel having a pixel value associated with an amount of light impinging thereon, wherein the optical detector generates an image of the coated optical fiber in response to the light focused thereon by the lens; and a signal processor electrically coupled to the optical detector, the signal processor receiving the pixel values from the optical detector and processing the pixel values to determine the diameter of the first coating layer, the signal processor determining the diameter of the first coating layer by detecting at least one bright region in the image and determining that said at least one bright region corresponds to a boundary between the first coating layer and the second coating layer, the signal processor utilizing a relative location of said at least one bright region in the image to determine the diameter of the first coating layer.

17. The system of claim 16, wherein the first coating layer corresponds to a primary coating layer of the coated optical fiber and wherein the second coating layer corresponds to a secondary coating layer of the coated optical fiber, the primary coating layer being disposed about the optical fiber and the secondary coating layer being disposed about the primary coating layer.

18. The system of claim 17, wherein the signal processor determines the diameter of the first coating layer by utilizing the relative location of said at least one bright region to determine the thickness of the second coating layer, the signal processor determining the thickness of the second coating layer by counting pixels from the location of the bright region to an edge of the second coating layer opposite the boundary between the first and second coating layers and by correlating the count to a distance, and wherein the signal processor utilizes the thickness of the second coating layer to determine the diameter of the first coating layer by multiplying the thickness by 2 to obtain a first product and by subtracting the first product from a known diameter of the second coating layer.

19. The system of claim 16, wherein the first coating layer corresponds to a secondary coating layer of the coated optical fiber and wherein the second coating layer corresponds to a primary coating layer of the coated optical fiber, the primary coating layer being disposed about the optical fiber and the secondary coating layer being disposed about the primary coating layer.

* * * * *